Figure 1:
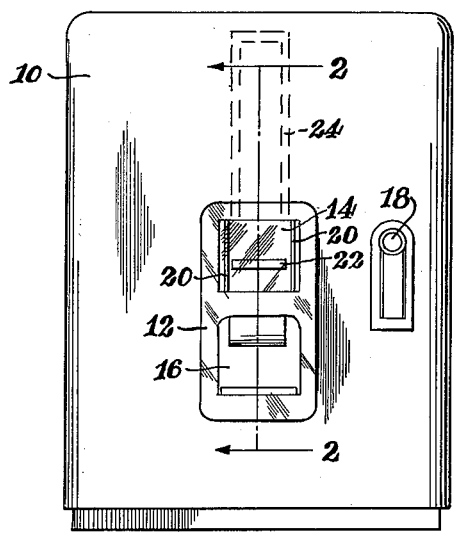

July 15, 1952 — C. C. MILLER — 2,603,142

APPARATUS FOR POPPING CORN BY HIGH-FREQUENCY RADIATION

Filed March 19, 1947 — 3 Sheets-Sheet 1

Inventor:
Cyril C. Miller
By Homer R. Montague
Attorney

Inventor:
Cyril C. Miller

By Homer R. Montague
Attorney

Patented July 15, 1952

2,603,142

UNITED STATES PATENT OFFICE 2,603,142

APPARATUS FOR POPPING CORN BY HIGH-FREQUENCY RADIATION

Cyril C. Miller, Altadena, Calif.

Application March 19, 1947, Serial No. 735,776

11 Claims. (Cl. 99—238.2)

This invention relates to the art of producing such food or confectionery products as popped cereals, particularly popped corn, and aims to provide an improved process for the production of such material substantially at the point of delivery to the ultimate consumer, thereby achieving a degree of freshness heretofore unobtainable except by extremely complicated apparatus requiring the services of an operator or attendant. More particularly, it is an object of the invention to provide a method and apparatus whereby popped cereal, particularly corn, is automatically processed, and vended direct to the consumer in packaged form, without the intervention of any attendant or operator.

A further object of the invention is to provide a method and apparatus for the automatic popping and dispensing of corn or similar materials which is much more efficient and fool-proof than heretofore known in the art, and which is particularly adapted to be carried out by a coin-controlled mechanism, permitting the operations of popping and dispensing to be performed automatically without human supervision, yet without adversely affecting the quality of the product, as would occur if conventional popping methods were attempted to be placed under automatic control.

A still further object of the invention is to provide a method of and apparatus for the popping of a predetermined quantity of corn kernels which have theretofore been placed in their ultimate container, such as a paper or glassine bag or the like, and the bag closed or sealed. In this way, the operations of measuring out the quantities of corn, inserting them in the bag, and closing and sealing the latter, may efficiently be carried out at a central point, such containers of unpopped corn being thereafter distributed to desired locations where coin-controlled apparatus for popping the corn and dispensing the containers of the finished product are provided. Since the volume of a given weight of corn kernels in the unpopped state is much less than that of the same weight after popping, this procedure, besides ensuring freshness of the finished product, enables a larger quantity or weight of the vended material to be loaded into a machine magazine of given size, with concomitant savings in the expense of replenishing the magazines of the dispensing units. Also, the feature of carrying out the popping operation at the dispensing point, in a manner making the same visible to the consumer or vendee, greatly enhances the commercial attractiveness of the dispensing machine.

A still further object of the invention is to provide a modified form of the apparatus which enables a supply of unpopped kernels to be metered, popped, packaged and delivered to the customer entirely automatically, and under such control that the quality of the product is uniformly good. In this connection, the advantages noted above with respect to the volume of popped corn are maintained, as compared with any machine which operates merely to package a portion of a pre-popped supply of corn, with accompanying loss of freshness.

Figure 2:
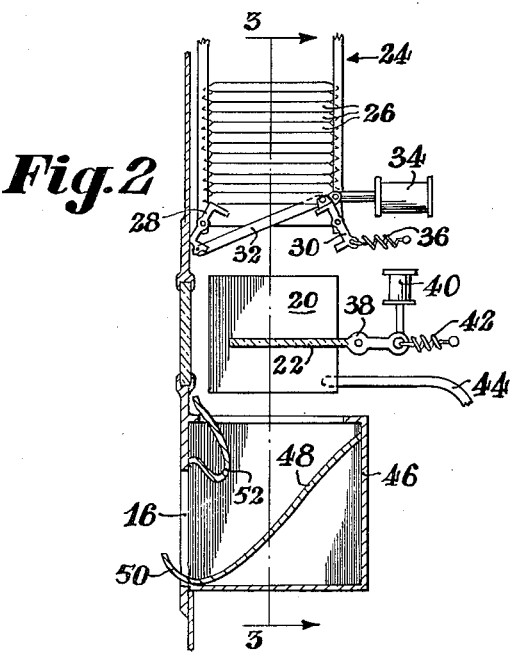
Figure 3:
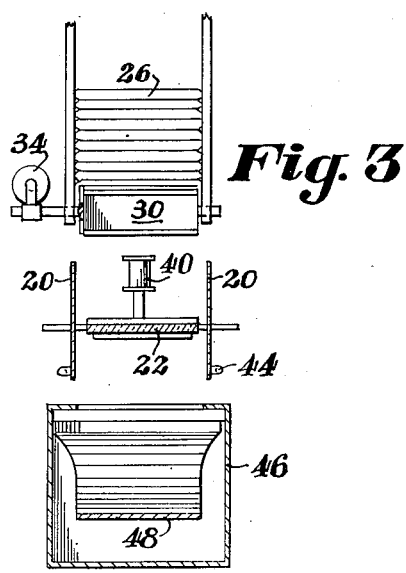
Figure 4:
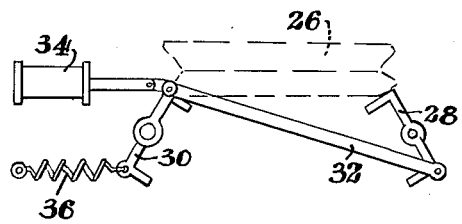
Figure 5:
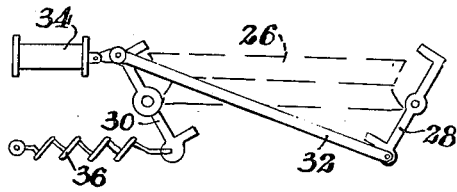
Figure 6:
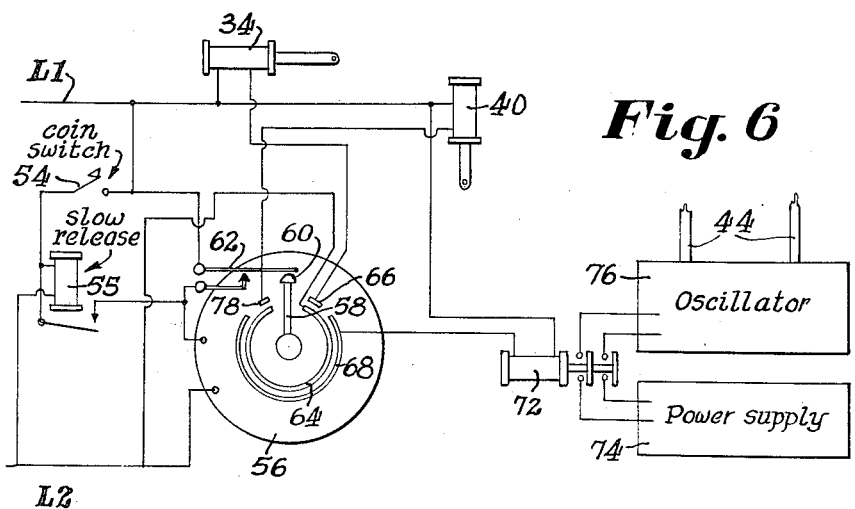
Figure 7:
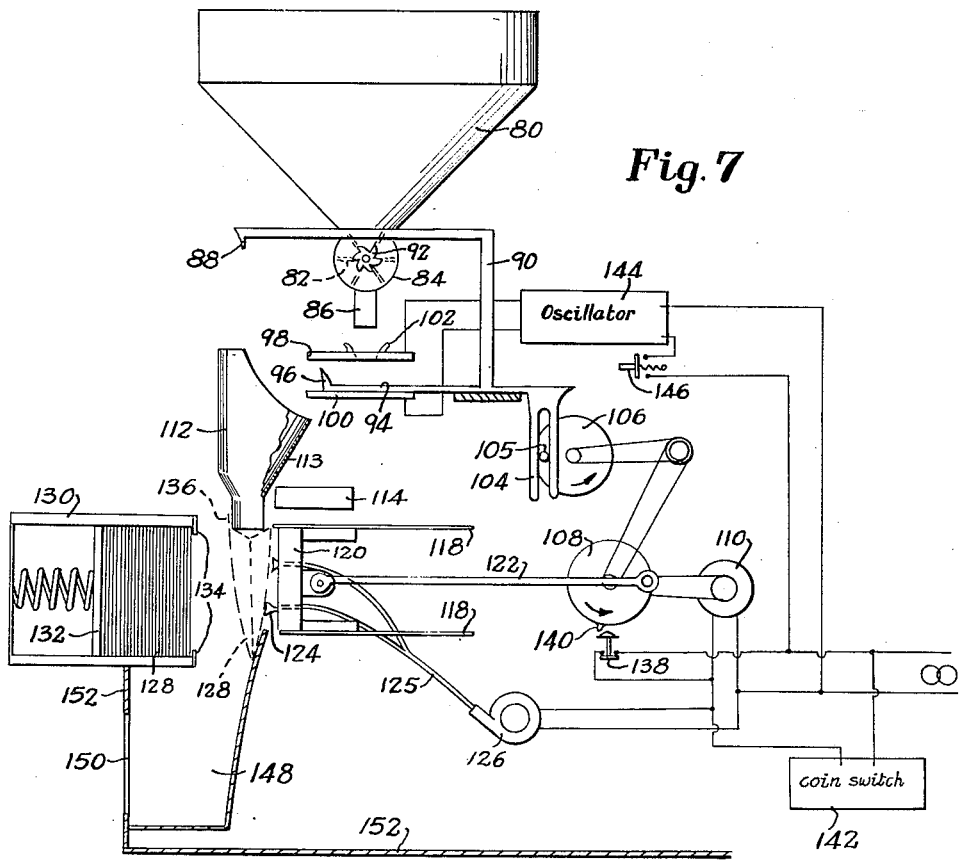

The above and other objects and advantages of the invention will best be understood by reference to the following detailed description of certain preferred embodiments of the method and apparatus, reference being had to the accompanying drawings, in which:

Fig. 1 is a front elevation of one form of coin-controlled popping and dispensing machine, Fig. 2 is a sectional view of a part of the machine shown in Fig. 1, taken along the line 2—2 of said figure, Fig. 3 is a diagrammatic view of the same parts as shown in Fig. 2, the section plane being indicated by line 3—3 of Fig. 2, Fig. 4 is an enlarged diagrammatic view showing one phase of operation of the kernel-containing bag releasing mechanism, Fig. 5 is a similar view but showing a later phase in the operation, Fig. 6 is a diagrammatic view of the circuit relations of the operating, control and power supply elements of the apparatus, and Fig. 7 is a diagrammatic view of a modified form of the apparatus.

It is, of course, well known that corn kernels can be caused to "pop," that is, everted by the explosion of the contained moisture, forming a starchy white mass many times the size of the original kernel, by the application of heat to said kernels, care being taken that excessive heat does not cause the product to burn or char. Heretofore, such popping operations have been carried out by subjecting the kernels, kept in constant random motion, to a heated atmosphere in a basket or other suitable container, and elaborate machinery has been developed to enable such operations to be carried out on a large scale, suitable seasoning and/or butter or margarine being applied to the product before or after it is packaged for dispensing. Such equipment, however, has always required more or less human supervision, in order to maintain proper temperature conditions, and to stop the process when most or all of the kernels have been popped, but before any charring takes place. Also, the use of conducted heat for heating the kernels has necessarily entailed a considerable inefficiency, as well as contributing to an undesirable fire hazard.

In accordance with the present invention, the actual popping of the kernels is accomplished by the use of high-frequency radiation in the form of an alternating dielectric field, which has been found to pop the kernels with great speed and regularity, and without the waste of any substantial quantity of heat energy, probably because the heat generated is all initially within the kernels, whereby all of such heat energy is effective to pop the corn. Moreover, since the heat is generated entirely within the kernels, due to their dielectric losses (or perhaps to the electrical losses of the contained water), it has been found possible to pop kernels which have already been packaged in a bag such as one of paper, glassine, regenerated cellulose sheet or the like, which greatly facilitates the dispensing or automatic vending of such containers of popped corn. Where the container is of a transparent or semi-transparent material, the operation of popping may desirably be carried out in full view of the customer or vendee, and the unexpected apparition of popped corn within a sealed and apparently empty container gives the process and apparatus great commercial appeal.

It has been found possible to coat the kernels, before loading predetermined quantities thereof into their ultimate containers, with suitable materials such as butter or margarine (the latter being preferred because of its keeping qualities), salt or other seasoning, the properties of such materials being carried over to the finished product, so that seasoning or flavoring need not be applied at the fully automatic vending station.

Referring not to Fig. 1 of the drawings, there is shown a suitable dispensing apparatus comprising a cabinet 10 provided on its front panel with a bezel or escutcheon plate 12 defining a transparent window 14 through which the popping operations may be observed, and a dispensing opening or window 16 for delivery of the container of finished popcorn. A coin receiving slot 18 of any desired or usual construction is provided to receive the coin of the vendee. Behind window 14 are located a pair of electrode plates 20, one lying on each side of a pivotally disposed shelf 22, and adapted to receive a package, such as a bag, containing unpopped kernels, from a magazine 24. As best shown in Figs. 2 and 3, means are provided for feeding a single container or bag 26 from the bottom of the stack in magazine 24, here shown as a pair of oppositely disposed sear-like or trigger members 28 and 30 interconnected by a link 32 for concomitant operation in opposite directions under the control of an electromagnet or solenoid 34. A spring 36 operates to maintain the members 28 and 30 normally in their Fig. 2 positions when solenoid 34 is not energized, the operation of the feeding mechanism being more fully described below in connection with Figs. 4 and 5.

As stated above, a shelf 22 is pivoted as at 38 for rotation from a horizontal position to a down-tilted position under the control of a second magnet or solenoid 40, but being normally maintained in its horizontal position by a tension spring 42. The material of shelf 22 is preferably a nonconducting material having a low dielectric loss factor (such as polystyrene plastic), since its function of supporting a bag 26 for dielectric treatment requires that it lie between the high-frequency electrodes 20 when the latter are energized via conductors 44.

Positioned between plates 20 and the bottom of the cabinet is an enclosure 46 adapted to receive the bag or container of popped corn when it is caused to slide from shelf 22 as the latter is tipped downwardly, and from which enclosure it may be removed through the front opening or window 16. An inclined partition such as 48 may be provided to direct the bag of popcorn toward a catching lip 50 for ready removal, and a deflector or baffle plate 52 is preferably provided to minimize the possibility that the customer or vendee will inadvertently attempt to reach into the apparatus with consequent danger of contact with the electrodes 20 or conductors 44.

The operation of elements 28 and 30 to release a single bag at a time from the magazine 24 is best shown in Figs. 4 and 5, in the former of which is shown how the bottom bag of the stack rests upon the upper legs of members 28 and 30. Upon operation of solenoid 34, appropriate linkage pulls member 30 counter-clockwise against the tension of spring 36, and link 32 simultaneously causes member 28 to rotate clockwise. Thus the entire stack of bags 26 drops a distance equal to the distance between the upper and lower legs of members 28 and 30, or substantially so. Obviously the bag-contacting legs of members 28 and 30 may equally well engage the bags by entering within their gusseted side walls, where gusseted bags are used. Upon deenergization of solenoid 34, members 28 and 30 move in reverse directions under the influence of spring 36, dropping the lowest bag 26 upon shelf 22 of Fig. 2, the upper legs of the dropping members engaging the next succeeding bag and securing the stack in position for the next operation. It will be understood that the distance between the upper and lower legs of each of members 28 and 30 is made such that only one bag is dropped for each operation of solenoid 34. It will be understood, also, that equivalent mechanism of any other type may be substituted for the feeding and dispensing operations described.

The operation of the above device in carrying out the process disclosed will best be understood by reference to Fig. 6, which illustrates diagrammatically the circuit arrangement of the control elements and the timer to provide the proper sequence of operations. Since the timer, coin control and similar elements may take many different forms, it is not intended to limit the same to the particular forms shown in this figure.

Numeral 54 (Fig. 6) represents any conventional kind of coin-controlled switch. Upon insertion of a proper coin in the apparatus, switch 54 is momentarily closed, completing a circuit from one side L1 of the local electric power supply, through the coil of a relay 55, and thence to the other side L2 of the power supply. Relay 55 hence closes its contacts, which completes a circuit supplying power to the motor 56 of a suitable timing contactor, here shown as provided with a metallic rotating conducting arm 58 provided with an insulating tip 60, the latter serving to open a pair of auxiliary contacts 62 whenever the motor arm 58 is in its normal or "home" position. As soon as timer 56 moves its arm (clockwise) away from its normal position, the motor circuit is maintained direct from the power lines L1 and L2 through contacts 62, thus ensuring a complete single revolution of the motor or timer whereupon it is stopped by the opening of these contacts by tip 60. During its rotation, conducting arm 58 sequentially connects line L2, through a conducting ring 64, to the operating elements of the apparatus. Specifically, ring 64 is first connected momentarily with a segment 66 to supply power to operate solenoid 34 to drop an untreated bag or container to the popping station defined by shelf 22. Thereafter, ring 64 is connected for a period to segment 68 to energize, by any desired form of contactor or relay 72, the high frequency oscillator 76, which derives its plate power from a power pack 74. As indicated above, oscillator 76 is connected to feed high-frequency energy over conductors 44 to the electrode plates 20.

After a sufficient, predetermined time, during which the kernels in bag 26 are caused to pop, arm 58 of timer 56 momentarily passes over a segment 78, thus connecting line power to solenoid 40 which tips shelf 22 and dispenses the package of popped corn to the vendee. Shortly thereafter, further rotation of arm 58 brings its insulating tip 60 in position to open contacts 62, whereupon the timer stops, with all the parts in their normal positions, until again operated by insertion of a coin.

Any desired and well-known form of coin-operated control may be utilized to perform the functions required in apparatus of this type, such as coin collection, slug detection, refusal of coin offered when machine is empty, and the like, since the present invention does not depend for its utility upon the particular form of such devices. In the interests of prompt operation of the device, it is preferable that the vacuum tubes utilized in power supply 74 and oscillator 76 be maintained with their heaters or filaments at operating temperatures at all times that the machine is intended to be used, contactor 72 merely operating to control the supply of plate power to the oscillator tubes when required. The power thus wasted in the filament circuits is trivial in amount, and is well sacrificed to fast operation of the device upon insertion of a coin. The details of the power supply and oscillator vacuum tube circuits are not shown herein, for the reason that their design and arrangement are well known in the electronic art, and form no part, as such, of the present invention. It has been found that the speed with which the corn is popped depends to some extent upon the frequency of the oscillator energy; suitably fast operation has been obtained, upon lots of approximately 200 kernels per glassine bag, by utilizing frequencies of the order of 150 megacycles per second, but lower or higher frequencies may of course be utilized if desired. It will be understood that, while a certain amount of heat is generated within the material of the bag itself, as well as within the kernels of corn, this heat is insufficient to produce any charring or other damage to the bag.

There is some advantage to be gained by maintaining the bags 26 in a horizontal position between the electrode plates 20, as herein shown, since this permits a more even distribution of the kernels within the high-frequency field than would be the case if the bags were placed on end. However, in theory, at least, the popping operation may be carried out with the bags in any position.

Referring now to Fig. 7 of the drawings, there is diagrammatically shown an apparatus embodying many of the principles of the form heretofore described, but modified to combine a popping operation with a bag filling and dispensing operation as separate stages of an integrated process. In this figure, numeral 80 designates a hopper adapted to receive a large quantity of unpopped kernels of the corn, provided with a metering outlet valve comprising a paddle wheel 82 having a plurality (here six) of blades arranged to rotate within a cylindrical portion 84 communicating at its upper side with the hopper 80 and at its lower side with a spout 86. Rotation of wheel 82 is accomplished by engagement of a tooth 88 on the end of an arm 90, which periodically engages one of the teeth of a ratchet wheel 92 secured to the shaft of wheel 82. Arm 90 is secured to a pusher member 94 whose forward end 96 moves periodically between a pair of high-frequency electrode plates 98 and 100. Upper plate 98 has a central opening therein bounded by a funnel-like extrusion or lip 102, through which drops a metered quantity of corn kernels upon each operation of paddle wheel 82.

Depending from member 94 is a fork 104 engaged by a pin 105 secured to a wheel 106 which is driven by belting, chain drive or the like from a master wheel 108 connected to a motor 110. Wheels 106 and 108 turn at the same speed and in the same direction, so that for each revolution of wheel 108, pusher member 94 and arm 90 execute one complete cycle of backward and forward motion.

Means to be described below are provided to energize the electrode plates 98 and 100 for a short period beginning just after pusher member 94 has withdrawn from between them and a charge of kernels has been dropped onto lower plate 100. Upon further rotation of wheel 106, and after disconnection of the high-frequency supply from the electrodes, pusher member 94 moves forwardly to push the popped kernels off of plate 100 and into a hopper 112, the lower inclined surface of which is provided with a plurality of screening perforations 113 (for example, of about 3/8" diameter) adapted to permit any unpopped or undersize kernels to drop into a bin 114 or equivalent container for disposal. Whole popped kernels proceed through hopper 112 and down into a dispensing bag 128.

In order to feed an opened bag into position beneath the spout of hopper 112 at the proper time for each cycle of machine operation, there is provided a reciprocating mechanism comprising principally guide elements 118 and a crosshead 120 mounted for sliding movement therein, said crosshead being driven by a connecting rod pivoted eccentrically on master wheel 108. Crosshead 120 has secured to its front face a plurality of suction cups 124 connected by flexible tube 125 to a suction fan 126 direct connected to a suitable motor.

A supply of flat-folded bags 128 is contained in a rack 130 having a spring-pressed plate 132 adapted to press the foremost bag against upper and lower stops 134 mounted on the rack 130, so as to leave the front surface of the foremost bag exposed for contact with suction cups 124. Upon each forward motion of crosshead 120, with fan 126 in operation, cups 124 engage the foremost bag in the stack, and draw the same rearwardly as the crosshead is retracted by further rotation of wheel 108. As will be seen in Fig. 7, the bags are conveniently of the type having one top edge longer than the other, and are so loaded in rack 130 that the shorter face is exposed to the suction cups 124. Thus, as the empty bag is carried along by crosshead 120, its upwardly extending rear edge 136 engages the spout of hopper 112, and continued rearward motion of the crosshead draws the gusseted bag into open position beneath the spout, just as crosshead 120 reaches its rearmost position as illustrated in the figure.

A normally closed switch 138 is so mounted with respect to the master wheel 108 as to be engaged, and opened, once during each revolution by a projection 140 on that wheel. This switch 138 controls, in parallel with the coin controlled switch indicated diagramatically at 142, the power circuit to motor 110. These parts are so arranged, in a well-known manner, that deposition of a coin in the coin-controlled mechanism 142 momentarily energizes the motor 110, for a sufficient time to enable rotation of wheel 108 to allow switch 138 to close, whereupon the circuit of motor 110 is maintained until broken by completion of a single revolution of the wheel, and consequent reengagement of projection 140 and the switch.

A high-frequency power source indicated at 144 is powered from the supply lines through a normally open switch 146 so located with reference to arm 90 as to be closed when, and only when, arm 90 is in its extreme right-hand position, looking at Fig. 7. The power supply and oscillatory circuit, here shown only diagrammatically, may include the features of stand-by operation already disclosed in connection with the previously described form of the invention.

Fig. 7 illustrates the parts of the apparatus as they are related just prior to completion of one machine cycle. It will be understood that motor 110 is still running to turn wheels 108 and 106 in the direction of the arrows, and that very shortly the motor circuit and that of fan 126 will be opened by switch 138, allowing filled bag 128 shown in dotted lines to drop into chute 148 for removal through an opening 150 in the machine casing 152. Thereafter, the parts remain as shown in the drawing until another coin is deposited.

Upon insertion of the coin, apparatus 142 closes the circuit of motor 110 and fan 126 momentarily, and the initial rotation of master wheel 108 closes switch 138 to maintain these circuits for one revolution of the wheel. As wheels 108 and 106 rotate, crosshead 120 moves forwardly until its suction cups engage a bag 128, during which time pusher 94 is being withdrawn from between electrodes 98 and 100. Just before pusher 94 reaches its rearmost position, the tooth 88 on arm 90 engages ratchet wheel 92 and rotates paddle wheel 82 a sixth of a turn to discharge a metered quantity of kernels between plates 98 and 100, the kernels falling upon the lower plate. Arrival of arm 90 at such rearward position also closes switch 146 for a predetermined period, energizing plates 98 and 100 and causing the kernels on plate 100 to pop. It will be noticed that the position of pin 105 on wheel 106 allows a slight dwell of members 90 and 94 at their rearmost position, which determines the period of energization of the plates, notwithstanding that the rotation of wheel 106 is continuous.

As wheels 106 and 108 continue their movements, crosshead 120 moves rearwardly, drawing with it a bag 128, since fan 126 runs continuously until the cycle is completed. Also, pusher member 94 starts forward, and switch 146 is opened, deenergizing plates 98 and 100. As the bag 128 approaches the spout of hopper 112, engagement of the rear face of the bag with the spout draws the bag into open position as shown in dotted lines, and thereafter pusher member 94 and its end 96 dislodge the popped kernels into hopper 112 and thence into bag 128, unpopped kernels being diverted to bin 114 for disposal. Upon completion of one revolution of wheel 108, slightly beyond the point indicated in Fig. 7, switch 138 is opened by projection 140, and motor 110 comes to a stop. Simultaneously, fan 126 is deenergized, allowing the filled bag to fall into chute 148 for removal by the operator or vendee, and the apparatus is ready for another cycle initiated by deposit of another coin in apparatus 142.

The above apparatus is preferably enclosed in a thoroughly shielded casing 152, to eliminate any possibility of interfering with radio equipment, but may be provided with inspection and observation windows to enhance its commercial appeal. Such windows may be of any transparent material, but are preferably treated in a known manner to maintain the shielding; for example, by using wire-mesh glass, or glass or plastic coated with a transparent conductive layer connected to the case or chassis. Also, suitable filters may be incorporated in the electronic circuits to minimize external radiation.

The kernels supplied in hopper 80 may be presalted and coated with butter or a suitable substitute therefor, or the popped corn may be seasoned by the purchaser after delivery of the bag.

Many variations of the details of construction and operation of equipment of the above type may be worked out, and I wish it to be understood that I intend to include in my invention all such changes as come within the scope of the appended claims.

I claim:

1. A machine for popping cereal kernels and dispensing metered amounts of such popped cereal kernels, comprising a housing, a supply of unpopped kernels in said housing, a pair of electrodes, a source of radio-frequency electric energy, mechanism for feeding a predetermined quantity of said kernels between said electrodes, electrical connections between said electrodes and said source whereby to pop kernels between said electrodes, mechanism to discharge the popped kernels from between said electrodes, and coin-controlled timing apparatus for actuating said mechanisms and energizing said source in timed relation to one another.

2. The invention in accordance with claim 1, in which the supply of kernels is divided among a plurality of dispensable containers, and in which the feeding mechanism comprises elements for feeding said containers, one at a time, into position between said electrodes.

3. The invention in accordance with claim 1, in which the supply of kernels is in bulk form, in which said feeding mechanism includes metering elements for measuring a quantity of said kernels into position between said electrodes, and in which is provided mechanism for discharging said kernels, after popping, from between said electrodes for removal from the machine.

4. The invention in accordance with claim 3, in which the discharging mechanism includes means for moving the popped kernels into a dispensable container for removal by the operator of the machine.

5. A corn-popping machine comprising a pair of electrodes, a source of radio frequency electric energy connected to said electrodes, means for supporting unpopped corn kernels within the electrostatic field generated by said electrodes, mechanism for depositing a predetermined quantity of kernels upon said supporting means and for discharging said kernels therefrom after treatment, and means for energizing said source in timed relation to the operation of said mechanism whereby said field is generated only a predetermined period of time said kernels are upon said supporting means.

6. A corn-popping machine comprising spaced electrodes, means for moving unpopped corn kernels into the space between said electrodes and thereafter out of said space, a source of radio frequency electric energy connected to said electrodes, and time controlled means for controlling the application of said electric energy to said electrodes in timed relation to the operation of said moving means whereby said energy is connected to said electrodes only a predetermined period of time said kernals are in said space.

7. An electronic popping apparatus for cereal kernels and the like, comprising a support adapted to receive a quantity of cereal kernels, electrodes disposed about said support, a source of high frequency electric energy connected to said electrodes to generate a high frequency field in the space occupied by such kernels, means operable to discharge popped kernels from said space, and means for energizing said source and for operating said discharging means in timed relation, said last named means including means for generating said field only a predetermined period of time said kernels are in said space.

8. The invention in accordance with claim 7, in which said support is formed of a material having a relatively small dielectric loss factor at the frequency generated by said source.

9. In a corn popping machine, means for supporting unpopped corn kernels, electrodes disposed about said supporting means, a source of high frequency electric energy connected to said electrodes, mechanism for depositing a predetermined quantity of kernels upon said supporting means and for discharging said kernels therefrom after treatment by the high frequency field generated by said electrodes, and means for operating said mechanism for depositing, energizing said source and operating said mechanism for discharging in sequence, said last named means including means for generating said field only a predetermined period of time said kernels are upon said supporting means.

10. A corn popping machine comprising a pair of electrodes, a source of radio frequency electric energy connected to said electrodes, means for supporting unpopped corn kernels within the electrostatic field generated by said electrodes, mechanism for depositing a predetermined quantity of kernels upon said supporting means and for discharging said kernels therefrom after treatment, means for energizing said source in timed relation to the operation of said mechanism, said mechanism including a plurality of solenoids and a rotatable conductor arm for operating said solenoids and said last named means including a solenoid operated during rotation of said arm.

11. A corn popping machine comprising spaced electrodes, means for moving unpopped corn kernels into the space between said electrodes and thereafter out of said space, a source of radio frequency electric energy connected to said electrodes, time controlled means for controlling the application of said electric energy to said electrodes in timed relation to the operation of said moving means, said moving means including a movable pusher arm and said time controlled means including an arm movable with said pusher arm and engageable with a normally open switch of said source of energy.

CYRIL C. MILLER.

REFERENCES CITED

The following references are of record in the file of this patent:

UNITED STATES PATENTS

| Number | Name | Date |
|---|---|---|
| 1,104,990 | Harding | July 28, 1914 |
| 1,339,662 | Morgan | May 11, 1920 |
| 1,431,438 | Beier | Oct. 10, 1922 |
| 1,658,486 | Howe | Feb. 7, 1928 |
| 1,900,573 | McArthur | Mar. 7, 1933 |
| 2,123,663 | Roach | Nov. 1, 1934 |
| 2,443,594 | Boettler et al. | June 22, 1948 |
| 2,480,679 | Spencer | Aug. 30, 1949 |